United States Patent

Fu

[11] 4,079,275
[45] Mar. 14, 1978

[54] OIL-COOLED MOTOR

[76] Inventor: Chin-fa Fu, 235 Chung-Chen Road, Taichung, China /Taiwan, 400

[21] Appl. No.: 663,309

[22] Filed: Mar. 3, 1976

[51] Int. Cl.² .............................................. H02K 9/08
[52] U.S. Cl. ........................................ 310/57; 310/59; 310/83; 310/89; 74/467; 165/47
[58] Field of Search ................ 310/57, 54, 58, 59–61, 310/64, 65, 83, 89, 47, 50; 165/47; 184/6.12; 74/467, 468

[56] References Cited

U.S. PATENT DOCUMENTS

| 2,077,580 | 4/1937 | Patterson | 184/6.12 |
|---|---|---|---|
| 2,780,737 | 2/1957 | Labastie | 310/54 |
| 2,984,122 | 5/1961 | Woolley | 184/6.12 |
| 3,184,624 | 5/1965 | Solomon | 310/52 |
| 3,313,964 | 4/1967 | Mattson | 310/50 |
| 3,479,541 | 11/1969 | Robinson | 310/57 |
| 3,480,810 | 11/1969 | Potter | 310/54 |
| 3,562,564 | 11/1969 | Potter | 310/54 |
| 3,652,879 | 3/1972 | Plunkett | 310/50 |
| 3,733,503 | 5/1973 | Potter | 310/54 |
| 3,785,458 | 1/1974 | Caldwell | 184/6.12 |

*Primary Examiner*—R. Skudy

[57] ABSTRACT

This invention provides an oil-cooled motor, the housing of the motor comprising an oil storage chamber and at least one passage communicating with the storage chamber. The storage chamber is connected with one end of the armature shaft of the motor, while the passageway meets the other end of the armature shaft. Also, the armature shaft is provided with an axial passage communicating with the storage chamber and the passageway in the housing, whereby, during operation of the motor, the cooling oil will circulate along said passage and passageway and thus maintain the motor at a reduced operating temperature level. In another embodiment according to this invention, the housing of the motor is further provided with a second storage chamber around gearing at the output end of the armature shaft, and the oil stored in the second chamber is in communication with the passageway provided in the housing and the passage in the armature shaft. With this arrangement, better cooling effect may be obtained.

3 Claims, 3 Drawing Figures

OIL-COOLED MOTOR

BACKGROUND OF THE INVENTION

This invention relates to the cooling means of an electric machine, and more particularly to an electric motor having its housing and armature shaft provided with circulating passageways for cooling oil in order to prevent overheating during operation.

One of the most common and important problems in the application of machines is the temperature rise resulting from various losses, such as copper losses, brush-contact loss, core loss, mechanical loss, stray load loss, etc. And, as well known in the art, the operating temperature of a machine is closely associated with its life expectancy, because deterioration of the insulation is a function of both time and temperature. Such deterioration is a chemical phenomenon involving slow oxidation and brittle hardening and leading to loss of mechanical durability and dielectric strength. Therefore, various cooling means or ventilating systems are proposed for such machines to remove the heat arising from the inevitable losses, and thus to prevent overheating of the machines.

Of the many types of cooling means available, the most common are cooling fans. However, the cooling problem in electric machines in general increases in difficulty with increasing size. This problem is a particularly serious one in large machines, where economy, mechanical requirements, shipping, and erection all demand compactness. Therefore, the conventional type of cooling fan can not ensure that the cooling air will effectively remove the heat arising from the losses; and in a machine of this type, deterioration of the insulation and burning of brush or coil windings still frequently occur thereby reducing its life.

SUMMARY OF THE INVENTION

Therefore, it is an object of this invention to provide an electric machine, which is capable of operating at a relatively low temperature level. More specifically, this invention contemplates, deviating from the traditional ways, the provision of a new type of oil-cooled motor, wherein the housing of the motor is provided with an oil storage chamber and at least one oil passageway communicating with the chamber. The chamber is connected with one end of the armature shaft, while the passageway meets the other end of the armature shaft. Further, the armature shaft is provided with an axial passage communicating with the chamber and passageway in the housing. According to this invention, cooling oil in the chamber will circulate through the passageway inside the housing and passage inside the armature shaft, and thus effectively remove the heat arising from various losses during operation.

According to this invention, the oil-cooled motor may further comprise a second oil storage chamber around gearing at the output end of the armature shaft, said second oil storage chamber being in communication with the passageway provided in the housing and passage provided in the armature shaft, in order to increase the cooling effect and serve for lubricating of the gearing.

Accordingly, the important features of the oil-cooled motor according to this invention reside in that the cooling oil stored in the chamber may flow through the passageway provided in the housing and passage in the armature shaft during operation, such that a relatively low operating temperature of the motor is obtained.

This invention will become more readily apparent from the following description of a preferred embodiment thereof shown, by way of example, in the accompanying drawings.

DETAILED DESCRIPTION OF THE PREFERRED EMBODIMENT

Figure 1:
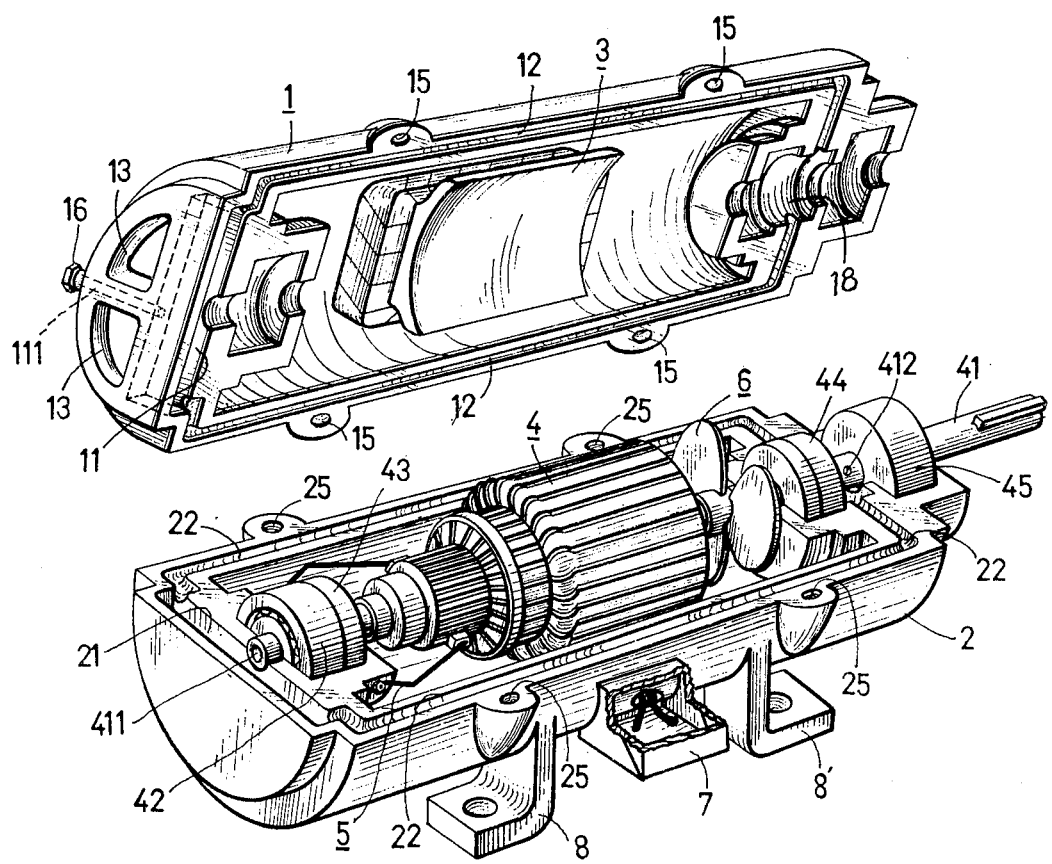
FIG. 1 is an exploded perspective view of an oil-cooled motor according to this invention, illustrating the oil storage chamber and passageway provided in the housing thereof.

Referring to FIG. 1, there is shown a preferred embodiment of the oil-cooled motor according to this invention. As can be seen, the housing of the motor includes an upper section 1 and a lower section 2. The upper section 1 and lower section 2 may be tightly interconnected by screwing threaded bolts into threaded openings 15 and 25, to form a frame for the rotor 4 and stator 3.

The upper section 1 is provided with an open chamber 11 and a groove 12 surrounding the circumference thereof (see FIG. 1). At the middle of the top of the chamber 11, there is provided a vertical passage 111 (vertical when assembled), which extends completely through the thickness of the upper section and is closed at its outer end by means of a removable screw seal 16. In addition, the end face of said section 1 is provided with air ports 13 and 13'.

The lower section 2 is provided with fixing bases 8 and 8', and wire connection box 7. Moreover, the lower section 2 is provided with an open chamber 21 in a manner corresponding to the open chamber 11 of the upper section, such that the chambers 11 and 21 form a composite chamber 17 for storing oil (see FIG. 2) when the lower and upper sections are interconnected. As can be seen from FIG. 2, the chamber 17 is in communication with the space outside the housing via the vertical passage 111. Additionally, the lower section 2 is provided with groove 22 extending from both ends of groove 21 and surrounding the circumference of the lower section 2, such that the groove 22 and 12 form a closed passageway in the housing when the upper and lower sections are interconnected. Individually, grooves 12 and 22 are preferably shallow and of generally semi-circular cross section as can be seen in the perspective view of FIG. 1.

Figure 2:
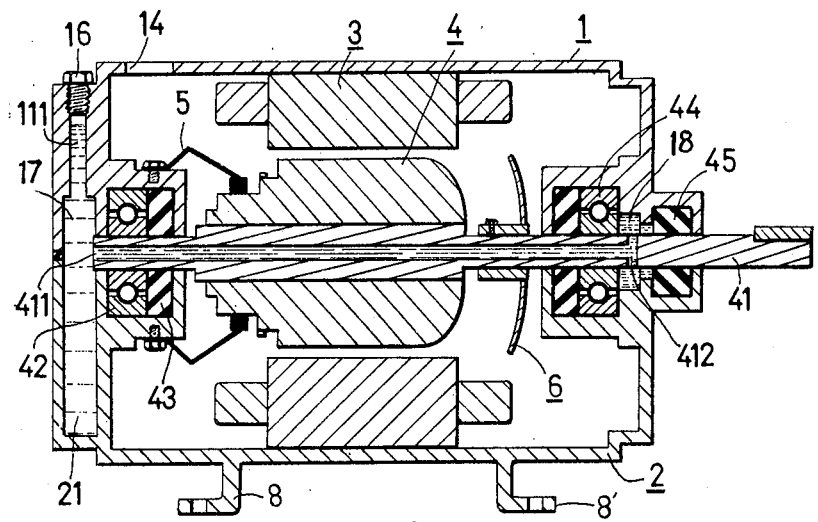
FIG. 2 is a diagrammatic sectional view of an oil-cooled motor according to this invention, showing the axial passage provided in the armature shaft thereof.

In addition, the armature shaft 41 is provided with an axial passage 411, as best shown in FIG. 2. One end of said passage 411 is in communication with the oil storage chamber 17, while the other end of said passage 411 is in communication with the grooves 12 and 22 via a radial passage 412 in shaft 41 at the meeting position of the armature shaft and an annular chamber 18 surrounding shaft 41 and leading to the passageway formed with grooves 12 and 22, such that there is formed a circulating path communicating with the oil storage chamber 17, the passageway 12, 22 formed in the housing, the annular chamber 18, the radial passage 412, and shaft passage 411, when the armature 4, together with the shaft 41, is arranged to be supported by the lower section 2 and when the upper section 1 is connected thereto.

In the oil-cooled motor illustrated in this embodiment, the stator comprising a field winding and core assembly 3 is fixed to the housing in a conventional manner. The armature shaft 41 may be equipped with an air fan 6 in order to apply air cooling and increase the cooling effect. Additionally, at the meeting position of the armature shaft 41 and the motor housing, there is provided with suitable bearings 42 and 44 for the armature shaft, and oil seals 43 and 45 for preventing oil leakage through the clearances existing at the shaft ends. In addition, since the oil storage chamber and oil passage in the housing are defined by connecting the upper and lower sections of the housing, oil seal must be provided at the contacting surfaces of the upper section and lower section in order to prevent oil leakage from the passageway. Moreover, the upper section 1 includes an upper opening 14 for easy access to the brush, which is representatively shown by character 5.

After assembly of the oil-cooled motor according to this invention, any suitable cooling oil may be filled into the storage chamber 17 via the passage 111, and the passage 111 may be closed by a threaded seal bolt 16, whereby the rotation of armature 4 will cause the oil to circulate along passage 411 and passageway 12, 22, and thus lower the temperature of the motor during operation.

Figure 3:
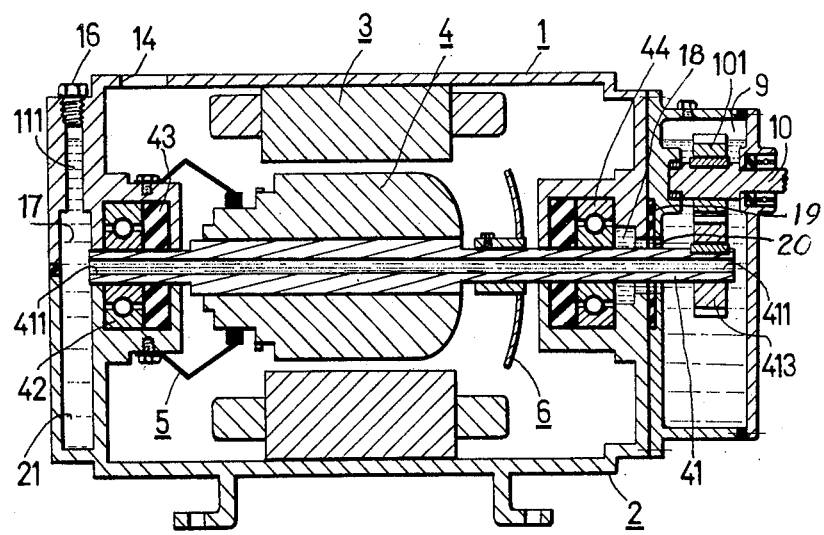
FIG. 3 is a diagrammatic sectional view of another oil-cooled motor according to this invention, showing the second chamber provided at the output end of the shaft.

The oil-cooled motor according to this invention may be provided with a second storage chamber 9 around gearing 413, 101, 10 at the output end of the armature shaft, as shown in FIG. 3, the storage chamber 9 being filled with oil, the passage 411 in the armature shaft 41 extending completely through the length of the shaft, and the storage chamber 9 being in communication with the passageway 12, 22 in the housing via the opening 20 about shaft 41 and through seal 19, and then to annular chamber 18 as before-described. The output shaft 41 is coupled with a driven shaft 10, which is partly shown in FIG. 3, through toothed wheels 413 and 101. Therefore, when the motor rotates, the oil will be stirred by the toothed wheels and the shaft, and will circulate along the passageway provided in the shaft and the housing, to obtain better cooling result. It should be pointed out that, besides cooling, the oil in the chamber 9 may additionally serve to lubricate the gearing consisting of toothed wheels 413 and 101.

What I claim is:

1. In an oil-cooled motor comprising an armature, shaft, gearing at the output end of the armature shaft, and a housing for said armature and said shaft, the improvement wherein:

said housing includes a first oil storage chamber therein containing cooling oil;

said housing includes at least one passageway communicating with said first storage chamber;

said shaft of said armature is provided with an axial passage communicating at one end of said shaft with said first storage chamber, and at the other end of said shaft with said housing passageway; and a second storage chamber is provided around the gearing at the output end of the armature shaft, the oil stored in said second chamber being in communication with said passageway provided in said housing and said passage in said armature shaft, whereby, during operation of said motor, cooling oil will circulate along said armature axial passage and said housing passageway to maintain said motor at a low operating temperature level.

2. An oil-cooled motor as defined in claim 1, wherein, said housing comprises an upper section and a lower section, and said first oil storage chamber and second storage chamber and said passageway are formed by connecting the upper section and lower section in liquid-tight manner.

3. An oil-cooled motor as defined in claim 1, wherein, said housing is further provided with a vertical passage, one end of sid vertical passage being in communication with said first oil storage chamber, the other end of said vertical passage being in communication with the space outside said housing for filling said first oil storage chamber with cooling oil, and wherein said motor includes a seal member for the closing of said vertical passage.

* * * * *